United States Patent [19]
Bening et al.

[11] Patent Number: 6,061,819
[45] Date of Patent: May 9, 2000

[54] GENERATION OF REPRODUCIBLE RANDOM INITIAL STATES IN RTL SIMULATORS

[75] Inventors: Lionel Bening; Kenneth Chaney, both of Plano, Tex.

[73] Assignee: Hewlett-Packard Company, Palo Alto, Calif.

[21] Appl. No.: 08/999,099

[22] Filed: Dec. 29, 1997

[51] Int. Cl.[7] .............................. G01R 31/28; G06F 11/00
[52] U.S. Cl. ........................................................... 714/741
[58] Field of Search .................................... 714/741, 736, 714/737, 738, 739, 728, 819, 766; 395/500.05, 500.06, 500.19

[56] References Cited

U.S. PATENT DOCUMENTS

| | | | |
|---|---|---|---|
| Re. 35,861 | 7/1998 | Queen | 395/772 |
| 4,862,399 | 8/1989 | Freeman | 714/738 |
| 5,446,742 | 8/1995 | Vahabi et al. | 714/744 |
| 5,479,414 | 12/1995 | Keller et al. | 714/726 |
| 5,502,729 | 3/1996 | Nakata | 714/728 |
| 5,530,958 | 6/1996 | Agarwal et al. | 711/3 |
| 5,546,408 | 8/1996 | Keller | 714/741 |
| 5,583,787 | 12/1996 | Underwood et al. | 714/738 |
| 5,594,741 | 1/1997 | Kinzelman et al. | 714/741 |
| 5,692,177 | 11/1997 | Miller | 395/608 |
| 5,778,069 | 7/1998 | Thomlison et al. | 380/25 |
| 5,815,513 | 9/1998 | Hiraide | 714/741 |
| 5,859,962 | 6/1999 | Tipon et al. | 714/741 |
| 5,867,395 | 2/1999 | Watkins et al. | 364/488 |

OTHER PUBLICATIONS

Ghosh et al., A Design for Testability Technique for RTL Circuits Using Control/Data Flow Extraction, IEEE, 1996, pp. 329–335.

Gupta, Phi–Test: Perfect Hashed Index Test for Test Response Validation, IEEE, 1993, p. 588 to 591.

Giraldi et al., EST: The New Froniter in Automatic Test–Pattern Generation, IEEE, 1990, p. 667 to 672.

Ghosh et al., Sequential Test Generation at the Register–Transfer and Logic Levels, IEEE, 1990, p. 580 to 586.

*Primary Examiner*—Albert De Cady
*Assistant Examiner*—Shelly A Chase

[57] ABSTRACT

The inventive mechanism generates reproducible random initial states for use in simulation testing a design of a logic machine. The mechanism uses the hierarchical path names for the modules of the design and a random seed to generate reproducible random initialization states. Since the path names and the seed are known quantities, the random number can be reproduced. This allows the logic designs to be tested by different simulation methods and still have the same initialization states. Furthermore, if the simulation fails, design changes can be verified by using the same initialization states which caused the failure.

22 Claims, 1 Drawing Sheet

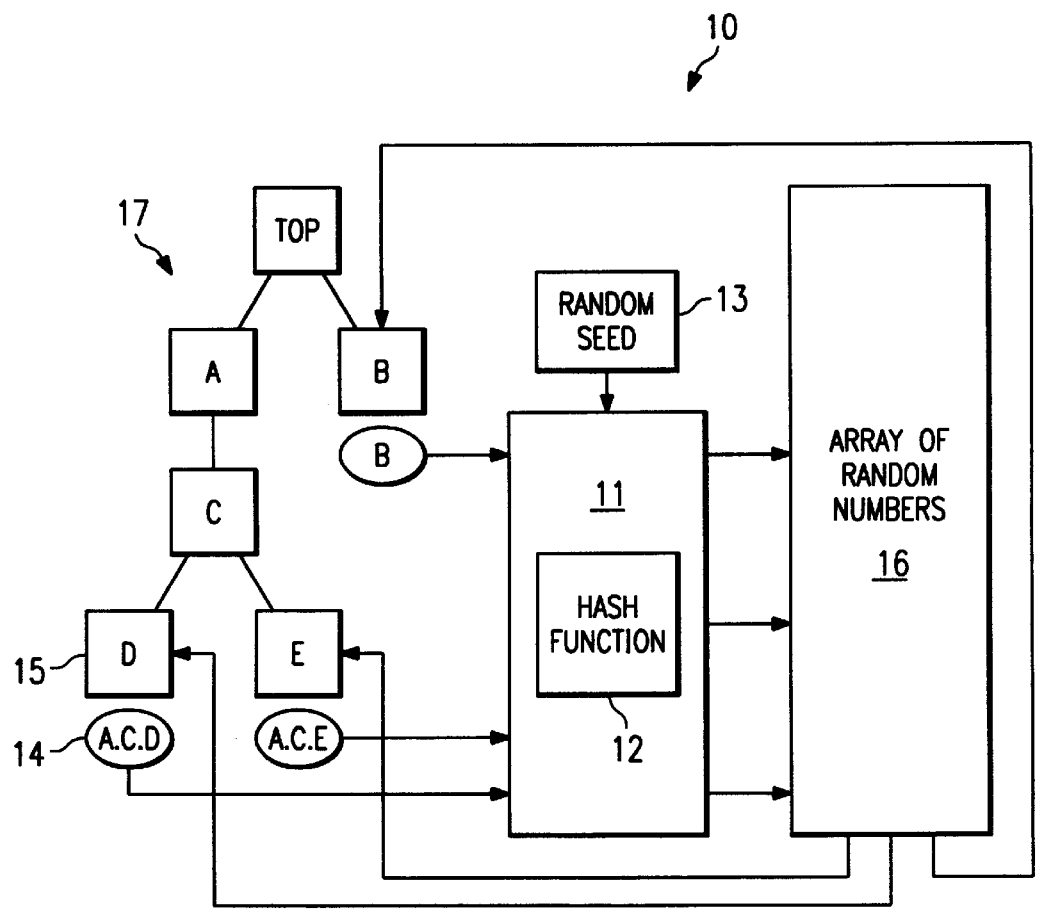

GENERATION OF REPRODUCIBLE RANDOM INITIAL STATES IN RTL SIMULATORS

TECHNICAL FIELD OF THE INVENTION

This application relates in general to complex digital system models, and in specific to a mechanism for generating reproducible pseudo-random states for initialization of simulations used for testing the system models.

BACKGROUND OF THE INVENTION

Computer systems that comprise numerous storage elements often encounter problems during the initial power on procedure. When power is first applied to the system, the storage elements (flip-flops, registers, and memory arrays) begin in various random states. Some of these states will cause the system to operate incorrectly because of unanticipated interactions. Thus, the system would have to be shut down to clear the storage elements of the problematic state settings, and restart the system with different state settings that will hopefully not cause the system to lock up. This problem can occur with many home appliances such as CD players and VCR machines.

To obtain correct system initialization, a reset signal is invoked during start-up, such that the storage elements are all set to zero, or some benign initial state. However, as systems have become larger and larger, with more and more storage elements, then the reset signal cannot always be fanned out to all storage elements because of area and timing limitations. Thus, designers send the reset signal to the storage elements that can be reached within the fanout constraints. To reach the remaining elements, it requires several clock cycles with the reset signal active to achieve an acceptable start-up state in a correct design.

One prior art mechanism used to handle large system testing is to have two different simulation methods. One simulation method is event driven, which is used for diagnosis of design problems. The other is cycle based, which is much faster than the diagnosis oriented method, e.g. five to ten times faster, and is used for detection of design problems. Thus, when used together, the detection oriented method would determine which state would cause failure conditions, and the diagnosis oriented method would determine the reasons for failure. The detection oriented method gains speed by not accessing the internal states of the system model, e.g. the internal states of combination logic are not calculated during the simulation if it is part of an inactive path. The diagnosis oriented method could determine the reasons for failure because it can access the internal states.

A serious problem with this approach is reproducing or re-creating the faulting state detected by the cycle based or detection oriented method, for analysis by the event driven or diagnosis oriented method. This is particularly true if the states are generated in the detection oriented method by a random number generator. If a random number generator is used, then it is extremely difficult to re-create the precise faulting state. If the faulting state cannot be reproduced, then the diagnosis oriented method cannot accurately determine the reasons for failure.

Moreover, even if the cause of the failure has been determined or thought to be determined, then the prior art lacks a mechanism for verification that any changes to the design have resolved the failure. This is because even a small change to the design will cause large changes in the system initialization. Thus, it is essentially impossible to return to the state that caused the failure. In others the failing state cannot be duplicated so that the changes to the system cannot be verified.

Another prior art method is to test at the gate level, instead of at the register transfer level (RTL), and use a third logic value 'X' in addition to 0 and 1. The X value could represent either a 0 or a 1 in the simulation of the design. However, the X state is pessimistic (i.e. shows problems that do not actually exist) in terms of reporting hang up conditions in the start-up state in logic simulation. Moreover, gate level simulation is generally about 3 to 10 times slower than RTL simulation, thus gate level simulation is undesirable because the simulations run slower. Furthermore, since a storage element can comprise many gates, and the gate design is much more complicated to work with than the register design. Thus, RTL level is more desirable. However, using the X state at the RTL level yields results that are even more pessimistic than at the gate level.

Therefore, there is a need in the art for a system that performs simulations at RTL level, and allows re-creation of a precise state out of thousands of randomly simulated states. Such a system would allow the proper operation of a tandem system using a fast detection oriented simulation method and a slower diagnosis oriented simulation method with full accessibility. Such a system would also allow for verification of any system design changes.

SUMMARY OF THE INVENTION

These and other objects, features and technical advantages are achieved by a system and method which generates reproducible random states for use in testing an RTL level design of a logic machine. The random states are determined by the hierarchical path name and a random seed. Note that a different random seed is used for each different simulation run. Each ASCII character of the path names for the modules of the design is multiplied with a random time based seed. The resulting product is hashed by right shifting the product. The hashed product is then used as the seed for the next character. This process is repeated for each character of the path name. The final result is the reproducible random initialization state. Since the path names and the seed are known quantities, the random state can be reproduced. Note that the same random state will always be produced given the same random seed and path name.

The random state would then be inserted into the design, and the simulated system is tested by a detection oriented, cycle based simulation mechanism. If the system tests fail, the random states are reproduced for use by a diagnosis oriented, event based simulation mechanism which determines the cause of the failure. Verification of the failure correction is accomplished by re-running the simulation with the same initial state.

Random numbers used for the random states are stored in an array. The index for each value is calculated from the random seed and path name. The index is masked and the remaining portions are XORed. This resulting number is the index to the array portion where the random number is stored. As each index is hashed, prior to masking and XORing, it is compared to a previously determined index. If they match then the index is incremented such that a subsequent index to a different random number is used. This prevents multiple storage elements in the same module, which would have the same path name, from being loaded with the same state value.

The inventive mechanism also permits the verification of design changes made because of detected failure state conditions. The designer could precisely reproduce a failing initial state to determine if the changes would correct the problem, i.e. the failing initial state would not fail again.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

The FIG. 1 depicts the inventive mechanism operating with a design hierarchy.

DESCRIPTION OF THE PREFERRED EMBODIMENTS

The FIG. 1 depicts a testing system 10 using the inventive testing mechanism 11. The system 10 is testing the RTL level design hierarchy 17. The various blocks 15, i.e. A, B. C, D, and E, represent modules in the design hierarchy 17. Each of the various blocks have instance names 14, which are typically written in a hardware description language, and each name defines the hierarchical path to that block. As examples, the instance name of block D is shown as A.C.D, and the instance name of block C would be A.C.

The instance names 14 are the actual lexical names are retrieved by the inventive mechanism 11 and sent through a hash function 12, and mixed with a random seed 13 to generate an index. The resulting index selects random numbers from the array 16. The random numbers in the array 16 are then used to fill the states of the design hierarchy 17. If only the instance names or path names are used to select random numbers, then the selected numbers would have correlation with respect to each other because of the path nature of the names, i.e. A.C.D as compared to A.C.E could select correlated numbers when hashed. The random seed ensures that a good mixing of random states will be selected between runs and the correlation between the runs will be substantially destroyed.

A preferred embodiment for the random seed is the date and time, however other random seeds could be used. The random seed 13 in combination with the instance name 14 allows any state to be precisely re-created. Thus, the inventive mechanism 11 could be used with a detection oriented testing method to quickly generate random state values. The values are then inserted into the design storage elements and tested. When a faulting condition arises, a diagnosis oriented testing method could reproduce the exact faulting state, as the instance name and random seed will always hash to the same values.

Note that the array of random values 16 is created at the beginning of the simulation. A preferred embodiment for the size of the array is 512 32 bit words. Note that the size of the array can be made adjustable, e.g. 1024 words, as well as the size of each word can be adjustable. However, the quality of randomness achieved with the array must be compared to the application, such that correlation must be minimal or preferably non-existent.

Also note that in the FIG. 1, only the leaf node modules 15, i.e. modules B, D, and E, are being loaded with values from the array 16. This is because the storage elements in the FIG. 1 are located in the leaf nodes and not in the interior nodes, i.e. A and C. However, if such devices existed in interior nodes, then storage elements in those modules would be loaded from the array as well. Further note that each module could comprise many storage elements, each with the same instance name and each having the same seed, thus each would be loaded with the same random number. However, the inventive mechanism would detect this situation and merely pull sequential values for each sequential element. For example, assume module D 15 has a total of twenty storage elements. Thus, in loading up their respective values, the inventive mechanism would pull the hashed value indicated by the instance name of A.C.D and the seed, and then the next nineteen values. However other methods for loading different values into the same module could be used, so long as correlation is reduced or eliminated.

The following code, written in the C language, describes the hashing function 12 using the random seed 13:

```
#define RARRAY_MASK    0x000001ff
static int    last_hash;
static int    last_index;
...
#define ACCESS_RBIT_ARRAY(a) rbit_array [a++]; a &= RARRAY_MASK;
...
    bwd = ACCESS_RBIT_ARRAY(last_index);
...
hash_path(char *path)
{
    int    h,i,l;
    h = rseed;
    l = strlen(path);
    while (1) {
        l--;
        if (path[l] != '.')
            h = (h >> 4) * path [l];
    }
    i = ((h >> 21) ^ (h >> 14) ^ (h >> 7) ^ h) & RARRAY_MASK;
    if ((h != last_hash) || (strcmp(last_path,path) !=
        strcpy(last_path,path);
        last_hash = h;
        last_index = i;
    }
}
```

The hashing function hashes the path name to a 32-bit integer by multiplying the ASCII character codes of the path name, going from right-to-left, and shifting the product right by 4 each time. Then it calculates an index by XORing the four 7-bit bytes that comprise the right 28 bits of the hashed product. The character code multiplications are started with the random-number seed. In the code, h is set equal to the seed. An integer hash value is developed by taking each character of the instance name, except for the periods, and shift h right 4 bits, and then multiply it by one character in the path name. This is repeated for the whole path name. Then i is calculated, wherein i is the index into the random array. Only the right hand 9 bits of that hash value remain after the mask operation. Note that by shifting right and XORing the calculated hash value, all the bits in the hash integer contribute to the index values. The if statement determines whether the same value has been hashed as the previous time. If not, i.e. a different value has been hashed to, then the last hash is copied to and used as the last index. If it is the same, i.e. the same value has been hashed to, then the index value is increment by 1, as shown by a++. This situation would arise when there is a large number of words in a memory array at the same point in the hierarchy path, or there are multiple storage elements within a leaf node or module with the same path name. Thus, different values are achieved by drawing from successive address in the hash array. If needed, the index would wrap around the array. For example, if the value of 510 is hashed in the random number array and four random words are needed which would move beyond the array size of 512, then each time the index is incremented with the array masked to cause the wrap around and count from 511 to 0, 1, 2, 3.

Note that each time the RTL simulation is run the hash function can use a different random seed. Thus, if an overlap occurs as described above, then each time it is run through, different addresses will be involved. For example, consider the following:

| First RTL simulation run: +rseed=12345678 | | |
|---|---|---|
| index | hashed quantity | path name |
| 0000 | 651979be | cc__o.ccreg.r__memarb__ttype__fand |
| 0000 | 6f20e03a | mc__e.dl.dlio.r__mem__data__lowe__in |
| 0000 | a083fef6 | ma__e.t2ma__data__la.r__di |
| 0000 | c369f258 | ma__o.x2b0res.r__x__row__1 |
| ... | | |

| Second RTL simulation run: +rseed= 12345765 | | |
|---|---|---|
| index | hashed quantity | path name |
| 0470 | 3086fff6 | oads.oalogic.oaporto.r__head__oa__page |
| 0470 | 4338981d | oapopo.r__oapop__ram__page |
| 0470 | 800fdc51 | mc__e.r__me__ne__page |
| 0470 | ced9fd3d | cc__o.ccreg.r__memarb__ttype__fand |
| ... | | |

The path name cc__o.ccreg.r__memarb__ttype__fand that was first in the index 0 set with the first seed, now hashes to index 470 with the second seed. Note that all of its neighbors at index 470 with the second seed are different from those at index 0 with the first seed. Thus, the quality of random states is maintained. Note that the above is by way of example only, different values may arise from operation of the code.

The inventive mechanism, in addition to working with dual method testing systems, i.e. detection and diagnosis, will also operate with a one method system to provide verification of changes. For example, as correction and other changes are made to a design hierarchy, the designer could precisely reproduce a failing state to determine if the changes would correct the problem, i.e. the failing simulation would not fail again with the same initialization. Whereas random number generators would yield a different random state each time, thus, making it extremely hard to reproduce the failing initial state. Note that the verification aspects also apply to the dual method testing systems as well.

Although the present invention and its advantages have been described in detail, it should be understood that various changes, substitutions and alterations can be made herein without departing from the spirit and scope of the invention as defined by the appended claims.

What is claimed is:

1. A method for generating at least one reproducible random state for use in testing a design of a logic machine, the method comprising the steps of:

determining a path name for at least one module of said logic machine;

combining the path name and a seed to form a quantity;

hashing the quantity to form an index; and selecting a random number pointed to by the index which is used as the random state;

wherein the index can be reproduced from the path name and the seed.

2. The method of claim 1, wherein:

the seed is a random seed based upon a current date and time.

3. The method of claim 1, wherein the step of combining comprises the step of:

multiplying each character of the path name with the seed to form the quantity.

4. The method of claim 1, wherein the step of hashing comprises the step of:

shifting the quantity by a predetermined number.

5. The method of claim 1, wherein the step of combining includes multiplying each character of the path name with the seed to form the quantity, and the step of hashing includes shifting the quantity by a predetermined number, the method further comprising the step of:

repeating the steps of combining and hashing for each character of the path name.

6. The method of claim 5, wherein a random number is stored in an array, and wherein the step of hashing comprises the steps of:

determining an index in the array; and selecting the random number from a portion of the array identified by the index.

7. The method of claim 6, wherein the step of determining comprises the steps of:

masking the quantity; and

XORing a portion of the masked quantity.

8. The method of claim 6, wherein the step of determining comprises the steps of:

determining whether the quantity is equal to a previous quantity; and changing the index to a different portion of the array, if the quantity is equal to the previous quantity and a path name corresponding to the previous quantity is the same as the path name.

9. A method for testing a design of a logic machine using at least one reproducible random state, the method comprising the steps of:

determining a path name for at least one module of said logic machine;

combining the path name and a seed to form a quantity;

hashing the quantity to form an index which points to a random number;

inserting the random number into the design as a random state;

simulating an operation of the design with the random state;

reproducing, if the operation fails, the random state from the path name and the seed; and determining, if the operation fails, a cause of failure of the operation by using the random state determined from the step of reproducing.

10. The method of claim 9, wherein:

the operation is an initial start-up of the logic machine.

11. The method of claim 9, wherein the step of simulating comprises the step of:

testing by a detection oriented, cycle based simulation mechanism.

12. The method of claim 9, wherein the step of determining comprises the step of:

testing by a diagnosis oriented, event based simulation mechanism.

13. The method of claim 9, wherein the step of reproducing comprises the steps of:

recombining the path name and the seed to form the quantity; and rehashing the quantity to form the index to select the random number.

14. The method of claim 9, wherein:

the seed is a random seed based upon a current date and time.

15. The method of claim 9, wherein the step of combining comprises the step of:

multiplying each character of the path name with the seed to form the quantity.

16. The method of claim 9, wherein the step of hashing comprises the step of:

shifting the quantity by a predetermined number.

17. The method of claim 9, wherein the step of combining includes multiplying each character of the path name with the seed to form the quantity, and the step of hashing includes shifting the quantity by a predetermined number, the method further comprising the step of:

repeating the steps of combining and hashing for each character of the path name.

18. The method of claim 17, wherein the random number is stored in an array, and the step of hashing comprises the steps of:

determining an index in the array; and selecting the random number in a portion of the array identified by the index.

19. The method of claim 18, wherein the step of determining comprises the steps of:

masking the quantity; and

XORing a portion of the masked quantity.

20. The method of claim 18, wherein the step of determining comprises the steps of:

determining whether the quantity is equal to a previous quantity; and changing the index to a different portion of the array, if the quantity is equal to the previous quantity and a path name corresponding to the previous quantity is the same as the path name.

21. The method of claim 9, wherein:

the step of reproducing comprises reproducing the random state from the path name and the seed for use of said random state on a different simulator, thereby generating a reproduced random state; and the method of claim 9 comprises the further step of repeating said step of simulating on said different simulator employing said reproduced random state.

22. The method of claim 9, wherein:

the step of reproducing comprises the step of reproducing the random state from the path name and the seed for use of said random state after a design change on said logic machine, thereby generating a reproduced random state; and the method of claim 9 comprises the further step of repeating said step of simulating after said design change employing said reproduced random state.

* * * * *